(12) United States Patent
Mager et al.

(10) Patent No.: US 8,130,347 B2
(45) Date of Patent: Mar. 6, 2012

(54) COLORED MARKING OF TEXTS OR SYMBOLS IN A MONOCHROME LC DISPLAY

(75) Inventors: Gerhard Mager, Cadolzburg (DE); Christian Eric Sechelmann, Brieselang (DE); Ralph Staud, München (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 441 days.

(21) Appl. No.: 11/794,708

(22) PCT Filed: Nov. 9, 2005

(86) PCT No.: PCT/EP2005/055841
§ 371 (c)(1),
(2), (4) Date: Sep. 18, 2007

(87) PCT Pub. No.: WO2006/072494
PCT Pub. Date: Jul. 13, 2006

(65) Prior Publication Data
US 2008/0136999 A1    Jun. 12, 2008

(30) Foreign Application Priority Data
Dec. 30, 2004 (DE) .......................... 10 2004 063 593

(51) Int. Cl.
*G02F 1/1335* (2006.01)

(52) U.S. Cl. .............................. 349/117; 349/62; 349/64
(58) Field of Classification Search .................. 349/117
See application file for complete search history.

(56) References Cited

U.S. PATENT DOCUMENTS

| | | | |
|---|---|---|---|
| 5,694,793 A | 12/1997 | Nishimura et al. | |
| 5,695,269 A | 12/1997 | Lippmann et al. | |
| 5,949,346 A * | 9/1999 | Suzuki et al. | 340/815.45 |
| 6,473,144 B1 | 10/2002 | Ichikawa et al. | |
| 2003/0062780 A1 | 4/2003 | Kaneko et al. | |
| 2003/0206408 A1 * | 11/2003 | Funamoto et al. | 362/31 |
| 2004/0027041 A1 | 2/2004 | Nishikawa | |

FOREIGN PATENT DOCUMENTS

| | | |
|---|---|---|
| DE | 10141601 A1 | 3/2003 |
| DE | 10218577 A1 | 11/2003 |
| EP | 1300824 A2 | 4/2003 |
| JP | 2003083775 A | 3/2003 |
| WO | 2004006214 A1 | 1/2004 |

OTHER PUBLICATIONS

International Search Report dated Jan. 17, 2006.

* cited by examiner

*Primary Examiner* — Sung Pak
*Assistant Examiner* — Kajli Prince
(74) *Attorney, Agent, or Firm* — Laurence A. Greenberg; Werner H. Stemer; Ralph E. Locher

(57) ABSTRACT

A control and display unit for differentiated colored marking of texts or symbols provided with a monochrome LC-display and a backlight of the LC-display. A film, which is provided with a microstructure on at least one side, is arranged between the backlight and the LC-display.

13 Claims, 2 Drawing Sheets

COLORED MARKING OF TEXTS OR SYMBOLS IN A MONOCHROME LC DISPLAY

BACKGROUND OF THE INVENTION

Field of the Invention

The invention relates to an operating and display unit for differentiated colored marking of texts or symbols, with a monochrome LC display (liquid crystal display) and direct or indirect backlighting.

The colored marking of texts or symbols by means of color LC displays such as CSTN (color super twisted nematic) or TFT (thin film transistor) is known. However, these are expensive, and not suitable for all environmental conditions.

From U.S. Pat. No. 5,694,793, LC display systems for washing machines are known, whereby a distinction is made between passive and active illumination systems. Common to all the forms of embodiment described is a very complex structure, together with the lack of a possibility for being able to illuminate an individual display area with different colors, depending on a program.

SUMMARY OF THE INVENTION

One object of the invention consists in devising a low-price operating and display unit with which the differentiated colored marking of texts or symbols in a monochrome LC display is possible. Another object is to give greater design freedom in the structuring of operating and display units, in particular in the choice of position, dimension and color of the colored marking. Further objects are to achieve improved visualization of different program states compared to monochrome LC displays, and to provide a low-cost way of enhancing an LC display with monochrome backlighting into a display and operating unit with several display colors.

These objects are achieved by an operating and display unit for differentiated colored marking of texts or symbols, with a monochrome LC display and backlighting of the LC display, in which a foil is provided between the backlight and the LC display, the foil having a microstructure. The microstructure can be on one side or on several sides of the foil. Further, the microstructure can be provided within the foil, for example by particles which form the microstructure. A uniform alignment, for example of magnetic particles, can be effected by means of a magnetic field while the foil is being manufactured. In addition, the microstructure can be provided directly on the backlight or on the LC display. It is then possible to forgo any separate foil with microstructure.

The backlighting can be implemented, preferably as a single color, for example by means of LEDs (light emitting diodes) EL foils (electro-luminescence) or CCFL (cold cathode fluorescent lamp).

Here, the foil will preferably have regions with and without microstructure. The foil will preferably be an almost transparent foil, capable of transmitting light, with a preferred thickness of 1 to 2 mm. Due to the transparency of the foil, the backlighting can pass almost unhindered through the regions of the foil which have no microstructure. The sections of the LC display covered by regions of the foil which has no microstructure can instead also be implemented with no foil, so that only those sections of the monochrome LC display which are to be marked in color are provided with a foil with microstructure.

Furthermore, the regions of the foil can have microstructures which are similar or different from one another. Here, several forms of implementation can be distinguished. For example, a first region might have exclusively a microstructure of one and the same type, and a second region exclusively a microstructure which differs from the first region. A conceivable alternative to this is one single region which is made up of different microstructures. The individual regions can be arranged to be separated by a gap or equally to be adjoining one another.

In addition, the regions will preferably have geometric boundaries. The boundaries of the regions of the foil which have a microstructure will then preferably correspond exactly to the geometries which are to be marked or highlighted, as applicable, by a different color from the backlighting.

Furthermore, each region can be individually illuminated, independently of other regions, in one or more colors. For this purpose, one or more LEDs are provided adjoining the regions. Preferably, use will be made of one single-colored LED or a RGB LED (red-green-blue LED) for each region. Several LEDs of different colors and several LEDs of the same color or the same type, as applicable, can also be provided for each region. The LEDs will preferably be arranged in such a way that their light is introduced from the side into the regions of the foil which have a microstructure. The LEDs could be arranged on one side or on different sides of the foil, whereby the alignment of the LEDs relative to the foil can be varied. The LED colors which could be used are, for example, red, green, blue and yellow.

The microstructure can in addition have surfaces for the purpose of reflecting the light from the LEDs. These surfaces can, for example, be arranged in such a way that the light on the surfaces from the LEDs is radiated away perpendicularly to the surface of the foil, towards the LC display. The light from the LEDs will thereby preferably be reflected only at these surfaces, perpendicularly to the foil surface or at some other predetermined angle to it. The size, shape and alignment of the surfaces, together with the number of them per region, can be varied depending, for example, on the level of the desired intensity of the colored highlighting, or on predefined viewing angles from which the display is to be recognizable. For example, in order to ensure that the information, in the form of texts and/or symbols, which is to be marked in color and which can be switched by a program, is recognizable over a range of viewing angles, the surfaces provided can also be dished or curved, for example in the form of hemispheres.

The operating and display unit in accordance with the invention will be used, in particular, in home appliances such as washing machines, dryers, dishwashers and cooking devices, in which the differentiated, switchable multi-colored backlighting highlights visually for the user certain program states and interactive program functions by the colored marking of texts or symbols. The use of the operating and display unit in accordance with the invention is not restricted to these application examples.

The principle of the invention is explained in more detail below by examples, by reference to figures in which

DESCRIPTION OF THE INVENTION

Figure 1:
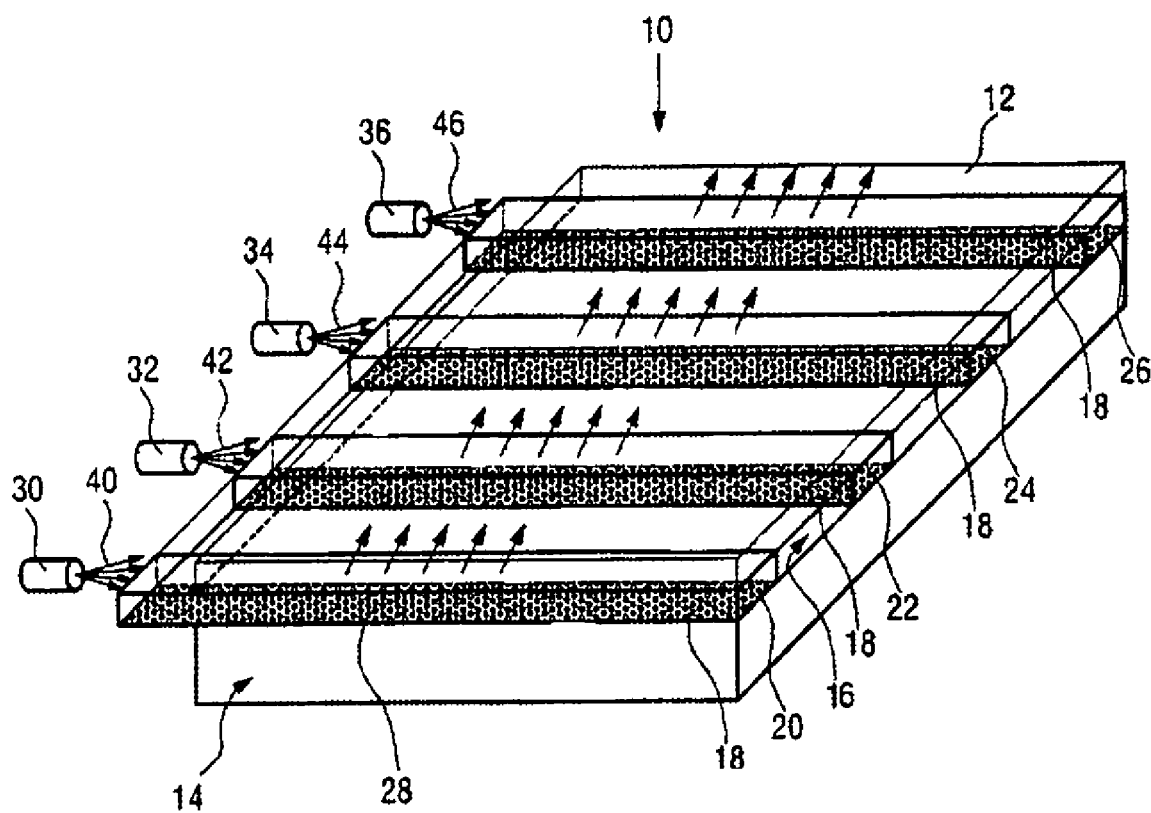
FIG. 1 shows a schematic diagram of an operating and display unit in accordance with the invention.

FIG. 1 shows an operating and display unit 10 in accordance with the invention, with a monochrome LCD display 12 and a backlight 14. A foil 16 is arranged between the LC display 12 and the backlight 14. The foil 16 has regions 20, 22, 24 and 26 with a microstructure 18. The microstructure 18 consists of a plurality of surfaces 28. At the surfaces 28, the colored light 40, 42, 44 and 46 introduced from the LEDs 30, 32, 34 and 36 arranged on the sides of the foil 16 is radiated away at an angle to the surface of the foil 16, towards the LC display 12. In this form of embodiment yellow light 42, for example, is introduced into the region 22 of the foil 16 by the LED 32 in order to highlight in yellow the program-dependent lettering "Hot-coloreds" against the single color, for example white, of the backlight 14.

In this form of embodiment, the regions 20, 22, 24 and 26 are defined by a right-angled geometry. With the form of embodiment shown in FIG. 1, red light 40 is introduced from the side into region 20 by the red LED 30, yellow light 42 into region 22 by the yellow LED 32, blue light 44 into region 24 by the blue LED 34 and green light 46 into region 26 by the green LED 36.

Figure 2:
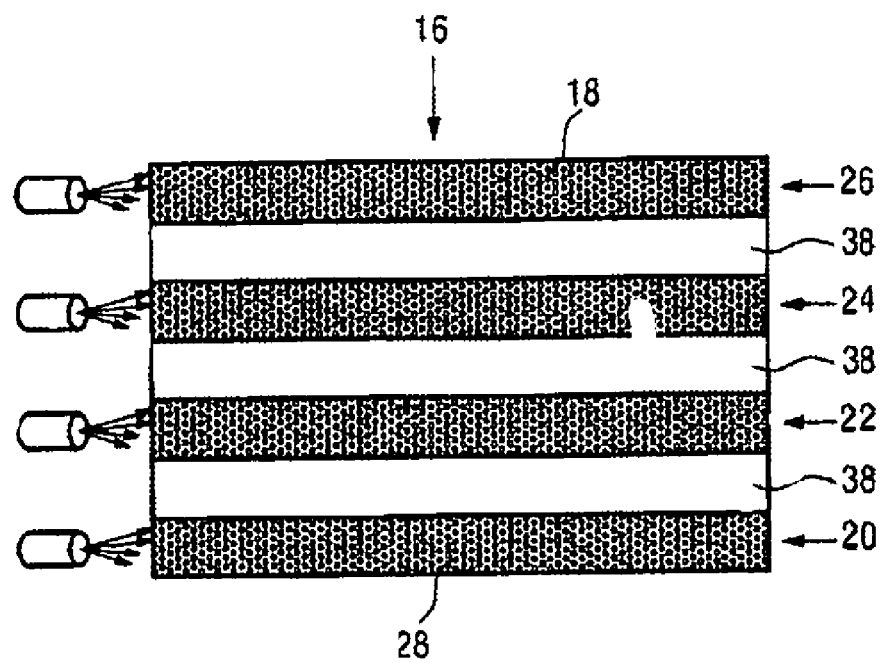
FIG. 2 shows a schematic diagram of a foil with microstructure regions.

FIG. 2 shows the foil 16 of the operating and display unit 10 already described in FIG. 1. Here, the regions 20, 22, 24 and 26 of the foil 16 which are provided with a microstructure 18 are shown with a right-angled geometry. In this form of embodiment, the microstructure 18 of the regions 20, 22, 24 and 26 has circle-shaped surfaces 28. Also shown are the LEDs 30, 32, 34 and 36, from which the colored light 40, 42, 44, and 46 is introduced from the side into the corresponding regions 20, 22, 24 and 26. The regions 38 of the foil 16 between the regions 20, 22, 24 and 26 do not have a microstructure 18, and because of the transparency of the foil 16 they enable the light from the backlight to pass virtually unhindered through the foil 16 for the purpose of illuminating the LC display.

Figure 3:
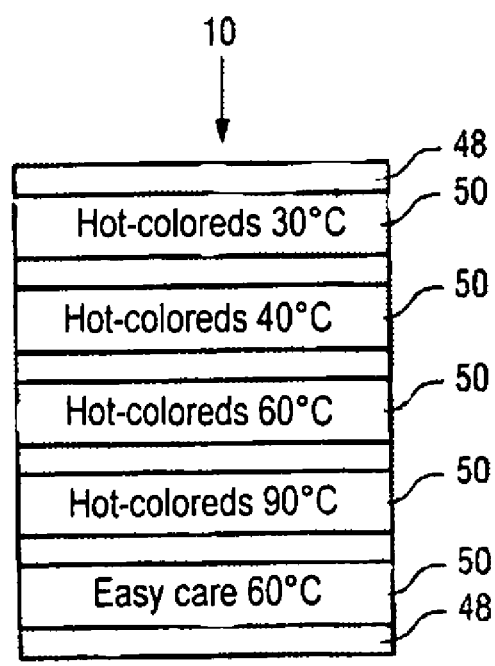
FIG. 3 shows an operating and display unit in accordance with the invention, with a display of different program functions.

FIG. 3 shows an operating and display unit 10 in accordance with the invention, with five sections 50. Here the texts, shown in the sections 50 by way of example, which can be switched according to the program, can be identified or highlighted in color. In this form of embodiment it is possible, for example, to highlight the lettering block: "Hot-coloreds 30° C." in green, the lettering block: "Hot-coloreds 40° C." in blue, the lettering block: "Hot-coloreds 60° C." in yellow, and the lettering block: "Hot-coloreds 90° C." in red against the single-colored white backlighting. The lettering block "Easy-care 60° C." and all the sections between the individual lettering blocks which can be highlighted in color, together with any bordering sections 48 which may be provided on the LC display, are backlit in a single color, for example white as in this form of embodiment, by the backlight.

Finally, it is noted once again that the operating and display units in accordance with the invention, described in detail above, are exemplary embodiments which a specialist can modify in a wide variety of ways without going outside the bounds of the invention. In particular, specific embodiments of the operating and display units can also take other forms from those described here. Such an operating and display unit can also be arranged in another form if space or design reasons make this necessary. Apart from this, for the sake of completeness attention is called to the fact that the use of the indefinite article "a" does not exclude the possibility of the characteristics concerned also being multiply present.

LIST OF REFERENCE MARKS

10 Operating and display unit
12 LC display
14 Backlight
16 Foil
18 Microstructure
20 Region of the foil with a microstructure
22 Region of the foil with a microstructure
24 Region of the foil with a microstructure
26 Region of the foil with a microstructure
28 Surfaces in the microstructure
30 Red LED
32 Yellow LED
34 Blue LED
36 Green LED
38 Region of the foil with no microstructure
40 Light (red)
42 Light (yellow)
44 Light (blue)
46 Light (green)
48 Border section of the LC display
50 Section of the LC display with no colored marking

The invention claimed is:

1. An operating and display unit for differentiated colored marking of texts or symbols, comprising:
a monochrome liquid crystal display;
a backlight for backlighting the LCD;
a foil disposed between said backlight and said LCD, said foil having first regions formed with a microstructure and second regions without a microstructure, said second regions being disposed between said first regions and separating said first regions from one another, and each of said first regions having a respective LED for individual and independent illumination thereof in one or more colors.

2. The operating and display unit according to claim 1, wherein said first regions have mutually different microstructures.

3. The operating and display unit according to claim 1, wherein said first regions have microstructures of a same type.

4. The operating and display unit according to claim 1, wherein said first regions have geometric boundaries.

5. The operating and display unit according to claim 1, wherein each said LED is a single-color LED.

6. The operating and display unit according to claim 1, wherein each said LED is an RBG LED or a plurality of LEDs of mutually different colors.

7. The operating and display unit according to claim 1, wherein each said LED is disposed to selectively introduce light radiation laterally into said first regions of said foil.

8. The operating and display unit according to claim 7, wherein said microstructure of said foil is formed with surfaces for reflecting the light radiation from said LEDs.

9. The operating and display unit according to claim 8, wherein said surfaces are aligned to radiate the light radiation from said LEDs substantially perpendicularly to a surface of said foil and towards said LCD.

10. In combination with a home appliance selected from the group consisting of a washing machine, a dryer, a dishwasher, and a cooking device, the operating and display unit according to claim 1.

11. An operating and display unit for differentiated colored marking of texts or symbols, comprising:
a monochrome liquid crystal display;
a backlight for backlighting the LCD;
a foil disposed between said backlight and said LCD, said foil having first regions formed with a microstructure and second regions without a microstructure; and
light sources associated with each of said first regions for individually illuminating each of said first regions independently of the remaining said first regions in one or more colors and substantially without illuminating said second regions.

12. The operating and display unit according to claim 11, wherein said second regions are disposed between said first regions and separate said first regions from one another.

13. An operating and display unit for differentiated colored marking of texts or symbols, comprising:
  a monochrome liquid crystal display;
  a backlight for backlighting the LCD;
  a foil disposed between said backlight and said LCD, said foil having first regions each defined by respective geometric boundaries and being formed with a microstructure and second regions without a microstructure, said second regions being disposed between said first regions and separating said first regions from one another, and each of said first regions having a respective LED for individual and independent illumination thereof in one or more colors.

* * * * *